United States Patent [19]
Geiger

[11] 4,121,464
[45] Oct. 24, 1978

[54] SYSTEM AND METHOD FOR GEOPHYSICAL PROSPECTING BY MEASUREMENT OF EARTH TIDES

[76] Inventor: Allen R. Geiger, 2600 E. Idaho, Las Cruces, N. Mex.

[21] Appl. No.: 843,500

[22] Filed: Oct. 19, 1977

[51] Int. Cl.² ............................................... G01V 9/00
[52] U.S. Cl. ............................. 73/382 R; 23/230 EP; 73/151; 181/0.5; 340/15.5 R
[58] Field of Search ............. 33/1 E, 1 H, 1 HH, 367, 33/377; 73/382 R, 382 G, 151; 181/0.5; 340/15.5 R; 23/230 EP

[56] References Cited
FOREIGN PATENT DOCUMENTS 1,314,888 12/1962 France ........................................ 73/382

OTHER PUBLICATIONS

Travaux de l'Association de Geodesie – Report by W. D. Lambert, Sep. 1936, 28 pages, pp. 1–3.
Transactions of American Geophysical Union–Jun. 1956, vol. 37. No. 3, pp. 266–272, "An Improved Instrument for Measurement of Tidal Variations in Gravity" by Clarkson et al.

Primary Examiner—James J. Gill
Attorney, Agent, or Firm—Allen D. Brufsky

[57] ABSTRACT

To locate potentially hydrocarbon-bearing subsurface formations, tiltmeters measure the time of arrival and the apparent direction of a lunar-induced earth tide at an array of points on the earth's surface. The measurements are combined to determine the shape of the tidal wave in a region of interest. The shape is indicative of subsurface viscosity in the region. Subsurface formations having an abnormally low viscosity are considered potentially hydrocarbon bearing.

12 Claims, 18 Drawing Figures

SYSTEM AND METHOD FOR GEOPHYSICAL PROSPECTING BY MEASUREMENT OF EARTH TIDES

BACKGROUND OF THE INVENTION

The present invention relates to geophysical prospecting and more particularly to a system and method for geophysical prospecting through measurement of earth tides.

For a number of years, people have had available an abundant supply of relatively inexpensive fossil energy in the form of oil and natural gas. However, the known sources or proven reserves of such fossil energy have not kept pace with the increasing demand, leading to critical short term shortages and less critical but still serious long term shortages.

While alternative sources of energy, such as nuclear energy or solar energy, are being explored it is not widely believed that such alternative sources will be available soon enough to avoid a severe international energy crisis.

The most feasible short term solution for the fossil fuel shortage is to find additional reserves of the fossil fuels. Various seismic techniques are used in efforts to locate certain kinds of subsurface formations using surface measurements. The nuclear, acoustic and electrical properties of such formations can all be studied through the use of measurements made at surface detectors.

The reason for making such measurements is to determine the most advantageous location for drilling an oil or gas well. Since the costs of drilling a well can be quite high, the geologist or other individual responsible for deciding whether to begin drilling needs to have as much information as possible about the subsurface formations in a region of interest before drilling to minimize the chances of a dry or nonproducing well.

SUMMARY OF THE INVENTION

The present invention complements known methods of geophysical prospecting and provides additional information about subsurface formations in any region of interest.

The present invention is a system and method for geophysical prospecting in which the rise and fall of the earth's surface due to the gravitational pull of the moon is detected. The time of arrival and apparent direction of this earth tidal wave is measured at a number of spaced points. The time and direction measurements are combined to establish the wave shape in the region of interest. The wave shape is indicative of the subsurface viscosity in the region. A region of abnormally low viscosity is a potential hydrocarbon-bearing region.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

DETAILED DESCRIPTION

Figures 1, 2, 3, 4, 5:
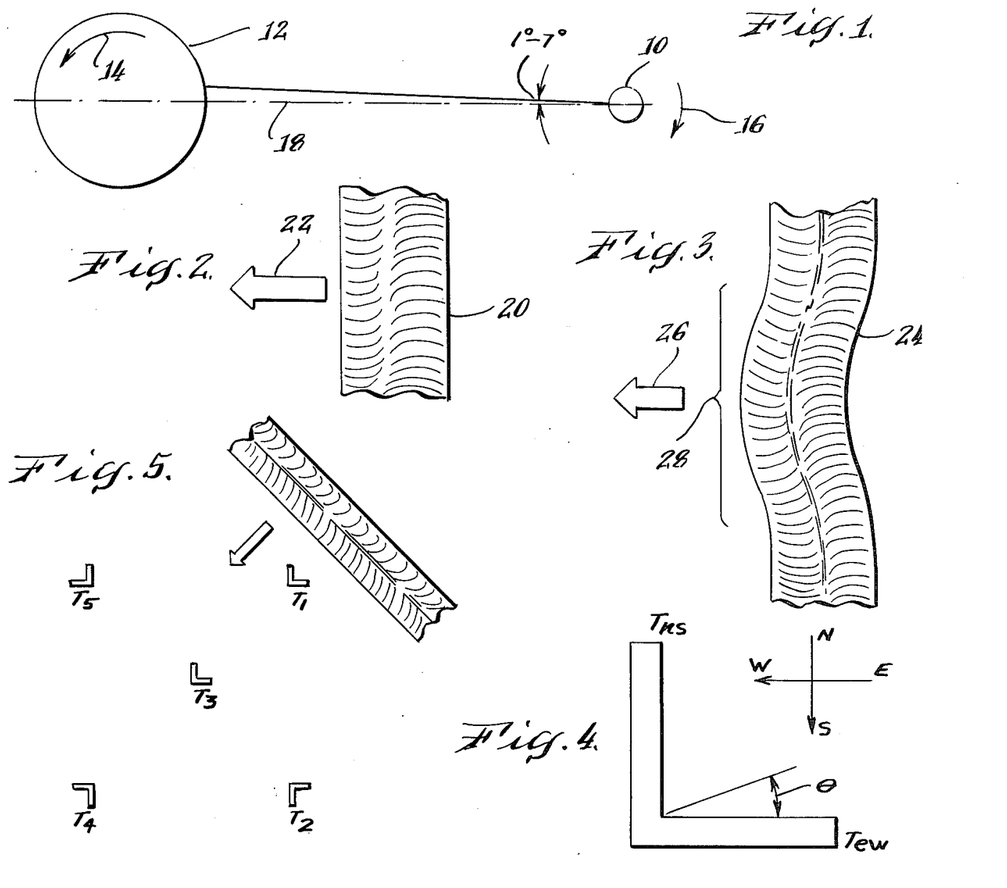
FIG. 1 is a simplified view of the earth and the moon showing the retardation of the earth tide.
FIG. 2 illustrates a section of earth tide in a region of uniform viscosity.
FIG. 3 illustrates a section of earth tide in a region of abnormal viscosity.
FIG. 4 is a schematic representation of a biaxial tiltmeter used to determine a time of arrival and apparent direction of movement of an earth tide at a single point.
FIG. 5 illustrates an array of tiltmeters used to track the movement of an earth tide through a region of interest.

Referring to FIG. 1, the effects of the gravitational pull of the moon 10 on the oceans of earth 12 have been noted and studied for many centuries. As the earth 12 turns on its axis in the counterclockwise direction indicated by arrow 14, (resulting in relative movement of the moon 10 in the direction indicated by arrow 16) the gravitational attraction of the moon generally causes ocean high tides at the particular point on the earth's surface which is on the center line 18 between the center of the earth's mass and the center of the moon's mass.

It is not widely recognized that the gravitational pull of the moon also causes the earth's crustal surface to rise and fall in a single advancing wave, referred to hereafter as an earth tide. Unlike high ocean tide, high earth tide does not occur at the center line 18. Because of the resistance or drag of the earth's crustal rocks, the maximum earth rise lags behind the center line 18 from 1° to 7° with approximately 5° retardation being normal.

The characteristcs of the advancing earth tide are influenced by changes in the density and viscosity of the medium through which it propagates; namely the earth's crustal surface. For example, in regions of lower-than-normal viscosity, the wave velocity will increase while in regions of higher-than-normal viscosity, the velocity will decrease.

Referring to FIG. 2, an earth tide 20 traversing a region of uniform viscosity in the direction indicated by arrow 22 will be seen to have a relatively straight leading edge and of uniform height. In contrast, FIG. 3 depicts a wave 24 propagating in a direction indicated by arrow 26 in a region of lower-than-normal viscosity. The section 28 of the wave above the low viscosity region is bowed outwardly in the direction of propagation and higher. Conversely, an earth tide traversing an area of higher-than-normal viscosity will tend to have a bow in a direction opposite the direction of propagation and lower.

Subsurface formations containing water or hydrocarbons, such as oil and/or natural gas will exhibit lower viscosity than "dry" formations. By measuring the earth's tide at a number of points on the earth's surface, the shape of the earth tidal wave in a region of interest can be established. Forwardly bowed sections of the earth wave will indicate potentially hydrocarbon-bearing, low-viscosity subsurfce formations.

To establish the wave shape, the time of arrival and apparent direction of the wave at each of a plurality of points is measured using devices known as biaxial tiltmeters. A preferred embodiment of such a device is described in detail later. Basically, a biaxial tiltmeter is a device for measuring the rise and fall of the earth's surface along two orthogonal axes as the earth tide traverses a region of interest. Referring to FIG. 4, a biaxial tiltmeter would include a first arm T1 for measuring the rise and fall of the earth due to the wave component traveling in a first direction, arbitrarily designated as east to west and a second arm for measuring the rise and fall of the earth's surface due to the wave component in a second direction, arbitrarily designated as north to south. Each tiltmeter arm is responsive to the rise and fall of the earth only along a single axis. For example, if an earth tide is traveling due west, arm T1 will (on a scale of 0 to 10) have a reading of 0. Conversely, if an earth tide is moving due south, arm T2 will have a reading of 10 while arm T1 will have a reading of 0.

An earth tide approaching the biaxial tiltmeter from some direction other than along one of the axes will cause both T1 and T2 to measure some rise in the earth's surface.

If an earth rise is detected at both T1 and T2, the angle of the approaching earth tide relative to one of the axes, designated as due east, can be calculted as a tangent of T2/T1. For example, if T1 has a reading of 7 while T2 has a reading of 3, the angle $\theta$ will be the arctangent of 7/3 or approximately 24°.

While the apparent direction of movement and the time of arrival of an earth tide can be found from a single biaxial tiltmeter, the distortion or dynamic changes in the wave shape can be established only by taking readings at a plurality of points in a region of interest. FIG. 5 illustrates a suitable array of tiltmeters T1, T2, T3, T4 and T5. To simplify computations, tiltmeters T1, T2, T4 and T5 are located at the corners of a square of known size while tiltmeter T3 is located at the center of that square. While this arrangement is preferred for computational purposes, any placement of tiltmeters could be used in which the distance and relative bearings between tiltmeters is known.

Figure 6:
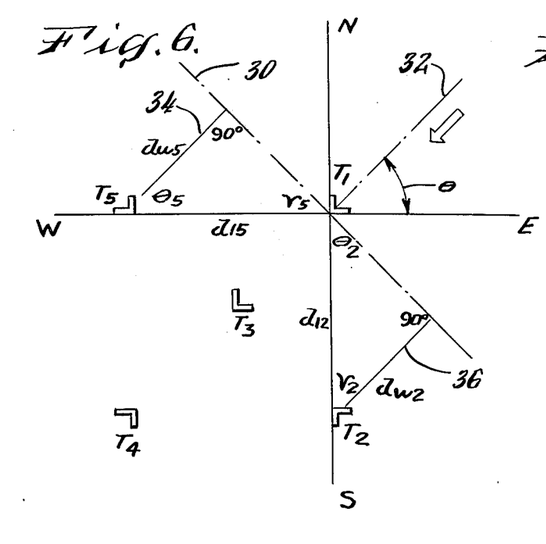
FIG. 6 is a diagram of trigonometric relationships used in analyzing an earth tide traversing an array of tiltmeters.

FIG. 6 illustrates the type of calculations which can be performed to establish the velocity of the wave front and to determine whether the wave front is straight or distorted.

In that Figure, it is assumed that the wave front has arrived at tiltmeter T1 and relative readings along orthogonal axes have established that an angle $\theta$ exists between due east and a normal 32 to the wave front 30. Basic geometry indicates that the angles $\theta_2$ between the wave front and due south and $\theta_5$ between due east and a normal 34 to the wave front are equal to $\theta$.

The normal 34 drawn from the wave front 30 to the tiltmeter T5 forms the third side of a right angle triangle having interior angles of $\theta 5$ and $\gamma 5$ where $\gamma 5$ equals $90°-\theta 5$. Since the distance $d_{w5}$ between tiltmeter T1 and tiltmeter T5 is known, the distance $d_{w5}$ between the wave front 30 and the tiltmeter T5 can be computed as $d_{w5} = d_{15} \sin \gamma 5$. The velocity of the wave front along the normal 34 is equal to the distance $d_{w5}$ divided by the time interval between the arrival of the wave at tiltmeter T1 and the arrival of the wave at tiltmeter T5.

Similar trigonometric relationships are employed in determining that the distance $d_{w2} = d_{12} \sin \theta 2$. If the wave is not distorting, its velocity along a normal 36 between the wave front and tiltmeter T2 will be equal to the velocity of the wave front along the normal 34 at tiltmeter T5. If the wave traverses the normals at different velocities, the wave front is being distorted by subsurface formations of abnormally high or abnormally low viscosity. Naturally, the operations of the various tiltmeters have to be synchronized on a time basis to permit velocity comparisons. Direct electrical connections between the tiltmeters with a single master clock might be used to establish the synchronization. Using ground loop currents to carry a timing signal is another possibility.

By taking readings at a number of spaced points in a region of interest, the shape of the wave front as it traverses the region can be established. By analyzing the wave shapes and the changes in those shapes, subsurface formations of abnormally high or abnormally low viscosity can be located in the region of interest.

The wave shapes in the region of interest are not static as they traverse a region of abnormal viscosity but rather change as they approach and leave the region due to the restoring force of the moon's gravitational pull. Elementary vector analysis indicates that the gravitational pull of the moon tends to maintain an earth tide having a relatively straight wave front.

Figures 7, 8:
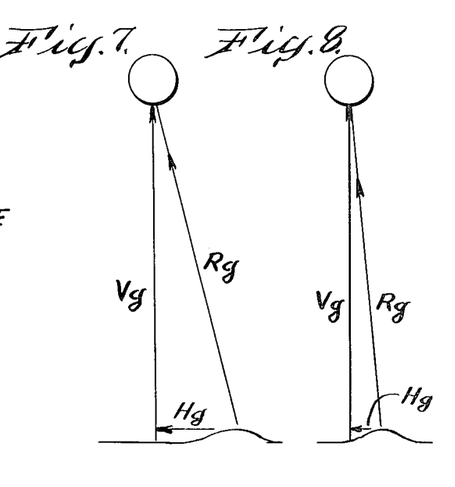
FIG. 7 is a vector diagram showing gravitational force vectors in a high viscosity region.
FIg. 8 is a vector diagram showing gravitational force vectors in a low viscosity region.

Referring to FIG. 7, the gravitational vectors in a region of abnormally high viscosity are shown. The total or resultant vector $R_g$ is a function of the magnitudes of a vertical vector $V_g$ and a horizontal vector $H_g$. While vertical vector $V_g$ is relatively constant, the horizontal vector $H_g$ will be relatively high in a high viscosity region due to the large included angle between the vector $R_g$ and the vector $V_g$. The horizontal vector $H_g$ will tend to increase the velocity of the retarded portion of the wave until a normal wave shape is re-established. FIG. 8 shows the same gravitational vectors in a region of abnormally low viscosity. The horizontal vector $H_g$ is relatively small in such a region causing any advanced sections of the wave to be gradually retarded relative to the rest of the wave as the earth tide passes beyond the region of abnormally low viscosity.

Figure 9:
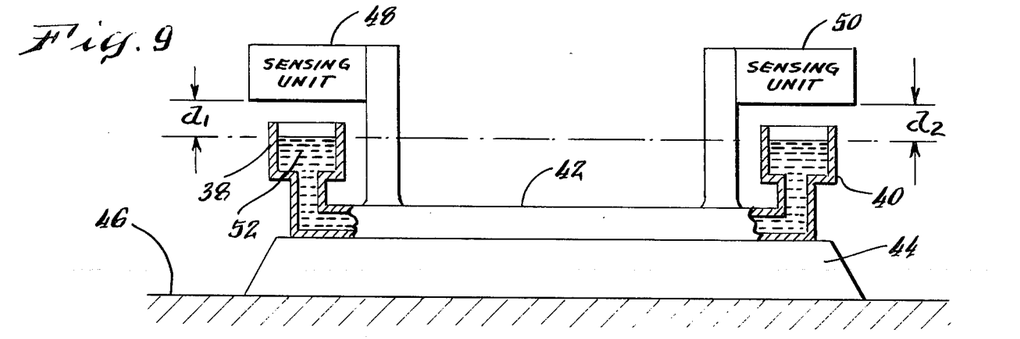
FIG. 9 is a view of part of a tiltmeter in a level position.

To measure the rise and fall of the crustal surface, a tiltmeter with an appropriate sensing unit must be employed. FIG. 9 is a greatly simplified, partially cut away view of such a device. The tiltmeter includes first and second open-topped cups 38 and 40 which communicate with each other through a connecting tube 42. This assembly is mounted on a base 44 which in turn may be placed on the earth's crustal surface 46. The assembly of cups 30 and 40 and the connecting tube 42 are filled with a liquid 52 such as mercury. A first sensing unit 48 is located above cup 38 while second similar sensing unit 50 may be located above cup 40. The function of each sensing unit, a preferred embodiment of which will be described in more detail later, is to measure the distance from the sensing unit to the surface of the liquid 52. If the unit is initially leveled on the earth's surface, the distance $d_1$ between the sensing unit 48 and a surface of the liquid in cup 38 will be equal to the distance $d_2$ between the sensing unit 50 and the surface of the liquid in cup 40.

Figure 10:
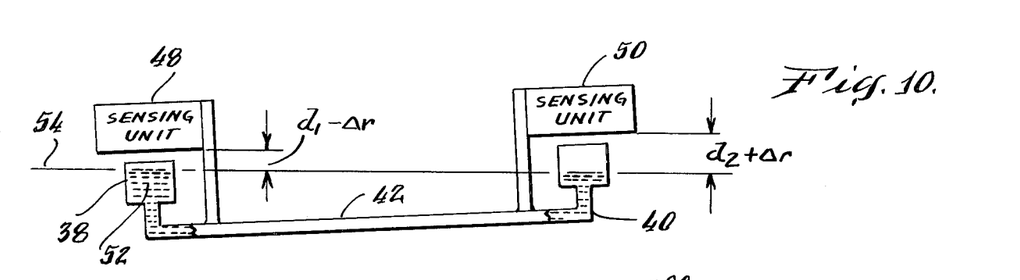
FIG. 10 is a view of the same part when tilted by a traversing earth tide.

When the earth tide passes the location of the unit, the entire unit will be tilted as the crustal surface of the earth rises and then falls. FIG. 10 shows, in greatly exaggerated fashion, how the unit would be tilted relative to a normal level line 54 when the crustal surface of the earth has risen beneath cup 40 to a greater extent than beneath cup 38. While the surfaces of the liquid in the cups 38 and 40 remain at the same level relative to the normal level line 54, the level of liquid in cup 40 falls relative to the upper surface of the cup and the sensing unit 50. Similarly, the level of liquid 52 in cup 58 rises relative to the sensing unit 48. Sensing unit 50 will detect a liquid-to-unit spacing of $d_2 + \Delta r$ while sensing unit 48 will detect a liquid-to-unit separation of $d_1 - \Delta r$.

Since the change in separation at one unit must be offset by an opposite, equal change at the other unit, only one sensing unit is needed to detect the rise at a given point on the earth's crustal surface. Two units would provide redundant data but may still be preferred to assure that data is still available in the event of failure of one of the sensing units. Also, since the data from the two units should correspond, any discrepancy between the outputs of the two units could be used as an indication that at least one of the units is malfunctioning or needs to be recalibrated.

Figure 11:
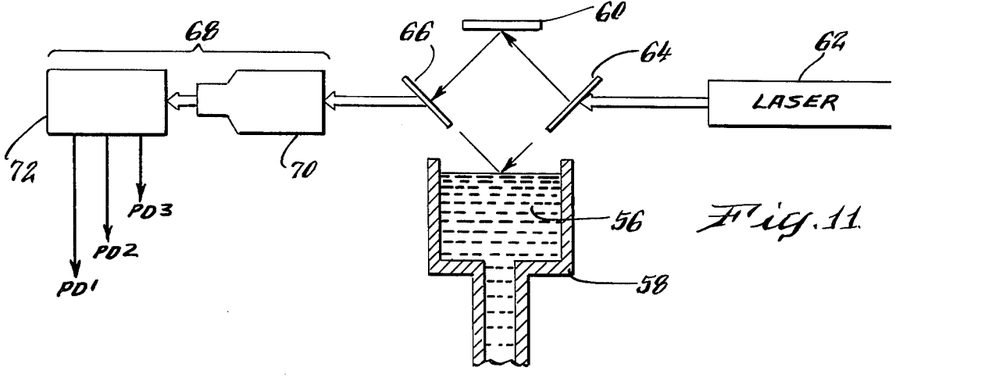
FIG. 11 is a schematic diagram of an interferometric tiltmeter suitable for measuring the magnitude of an earth tide at a particular point on the earth's surface.

FIG. 11 depicts an interferometric sensing unit for detecting changes in the level of a liquid 56 in a cup 58 relative to a mirror 60 positioned above the cup. The sensing unit includes a light source, preferably a monochromatic one such as laser 62, a beam splitter 64, a beam combining element 66, and an optical head 68 including a collimator tube 70 and a photodetector array 72.

The light beam generated by laser 62 is split at beam splitter 64 with a part being directed toward the surface of the liquid 56 and another part being directed toward the surface of the mirror 60. Light beams reflected from the surface of the liquid 56 and from the surface of the mirror 60 are recombined in the beam combining element 66 and applied as a single beam through the collimator tube 70 to the photodetector array 72. As the surface of the liquid 56 rises and falls, the changes in the path length from beam splitter 64 to liquid 56 to beam combining elements 66 will cause the recombined beam to display an interferometric pattern consisting of a series of alternating bright and dark bands that appear to move in one direction when the liquid surface is rising and in the opposite direction if the liquid surface is falling.

Figure 12:
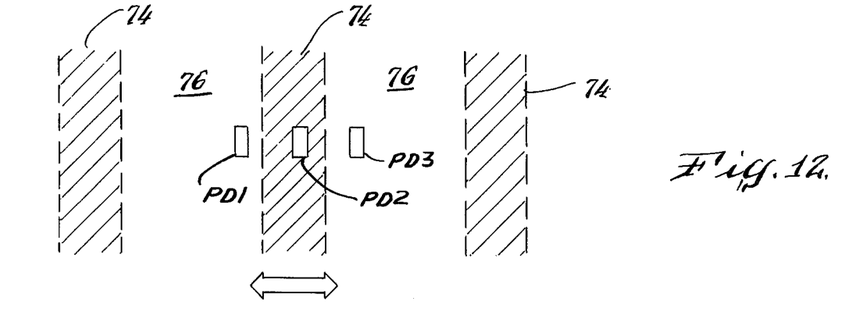
FIG. 12 illustrates the relationship between a preferred photodetector array in an optical head for a tiltmeter and interferometric bands generated by the interferometer of FIG. 11.

Referring to FIG. 12, photodetectors PD1, PD2 and PD3 in array 72 are used to count the number of interferometric bands, such as dark bands 74 and alternating light bands 76, which traverse the photodetectors. Signals provided by the photodetectors PD1, PD2 and PD3 also provide the information required to determine whether the bands are moving in one direction or the other. For purposes of explaining the invention, it is arbitrarily assumed that movement of the bands from left to right indicates a falling liquid level (which corresponds to a rise in the earth's crustal surfaces) while movement of the bands from right to left indicates a rising liquid surface or a fall in the earth's crustal surface.

The photodetectors PD1, PD2 and PD3 are spaced from one another such that no more one of the photodetectors is in a dark band 74 at any given time. If an output from a photodetector in a light band is assumed to be a binary 1, at least two out of the three photodetectors and periodically all three, will produce binary 1 signals at any given time.

Figure 13:
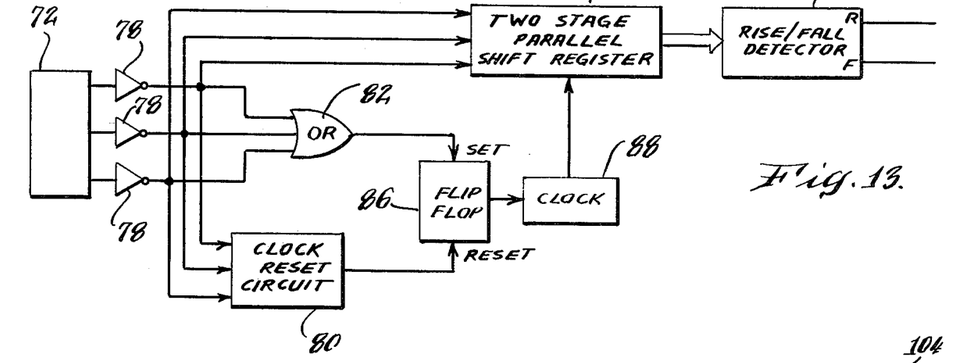
FIG. 13 is a block diagram of one portion of a circuit for measuring the magnitude of the earth tide at a point on the surface.

FIG. 13 is a block diagram of a portion of the logic circuits required to establish the magnitude and direction of changes in the elevation of the earth's crustal surface. Each of the three outputs from the photodetector array 72 is inverted by inverter amplifier 78. After inversion, no more than one of the signals will be a binary 1 level at any given time. The inverted signals are applied in parallel to a clock reset circuit 80, to an OR gate 82 and to a two stage parallel shift register 84. Both the clock reset circuit 80 and the two stage parallel shift register 84 will be described in more detail later. The output or OR gate 82 is applied to set input terminal of a flip flop 86. The output of the clock reset circuit is applied to the reset input of this flip flop. OR gate 82 provides a setting input to the flip flop 86 whenever one of the photodetectors in array 72 is in a dark band region. Clock reset circuit 80 on the other hand provides a reset pulse only when all three photodetectors are located in one of the light bands. When flip flop 86 is set, clock circuit 88 provides a clock pulse to the shift register 84 which shifts the three binary signals stored in the first stage to the second stage while permitting the signals at the output of the inverter amplifiers 78 to be entered and stored in the first stage.

Signals from both stages of the shift register 84 are applied to a rise/fall detector circuit 90 which decodes changes in the signal patterns to determine whether the light bands are moving to the right or to the left; that is, whether the earth's crustal surface is rising or falling. The rise/fall detector 90, which is shown again in block diagram form in FIG. 14, will be described in more detail later. A rise or R output from detector 90 is applied to a set input terminal of a flip flop 92 and to one input of a NAND gate 94. A fall or F output from detector 90 is applied to the reset input terminal of flip flop 92 and to the second input of the NAND gate 94. The flip flop 92 provides a count up/count down signal to a binary counter 96 which counts pulses generated by a monostable multivibrator 98 at the output of NAND gate 94. A second monostable multivibrtor 100 provides a "hand shake" signal which triggers a digital recorder 102. Digital recorder 102 records the contents of a binary counter 96. A plotter 104 is shown connected to the output of the digital recorder 102. Plotter 104 can accept data provided by digital recorder 102 and by other digital recorders in similar sensing circuits to plot the shape of the earth tidal wave in a region of interest. Changes in the shape of the wave indicate changes in subsurface viscosity which, in turn, indicate potentially hydrocarbon-bearing formations.

Figures 15, 16:
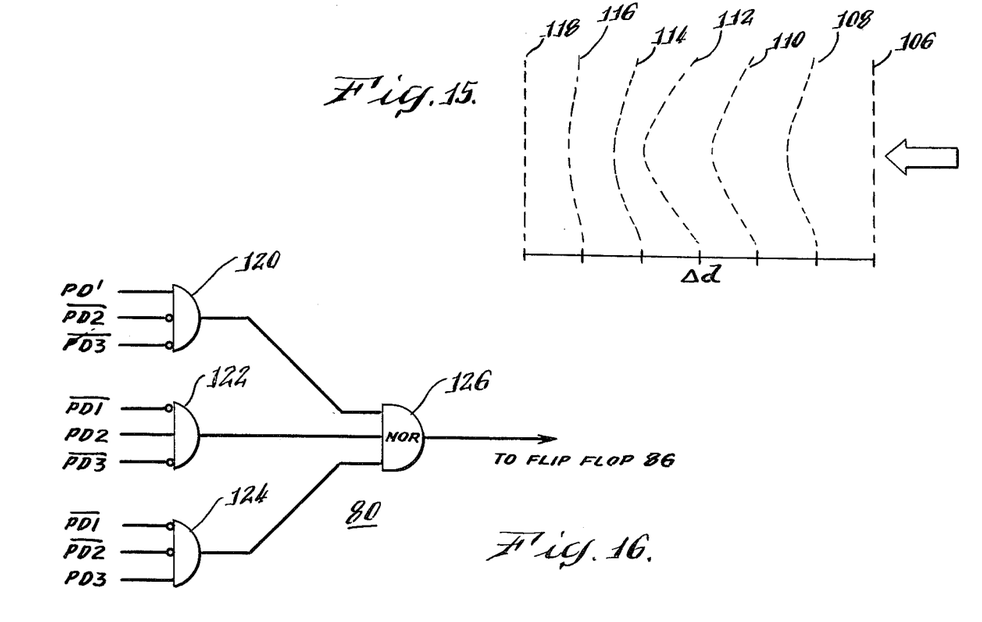
FIG. 15 is a log of tidal wave shapes in a region of interest at spaced time and distance intervals.
FIG. 16 is one embodiment of a clock reset circuit for the system shown in block diagram form in FIG. 13.

FIG. 15 depicts different shapes which an earth tide wave front assumes as it traverses a region of abnormally low viscosity from left to right. The successive wave shapes are displaced from one another in both time and distance. As a matter of convenience, the successive wave shapes are discussed below with reference only to the distance displacement. Wave front 106 is basically a straight wave front such as occurs in a region of uniform viscosity. Wave form 108, which represents the earth tide at some distance $\Delta d$ to the left of the location at which wave front 106 is detected, is slightly distorted to the left indicating that the earth tide is approaching a region of abnormally low viscosity. Wave form 110 is closer to the center of region of abnormally low viscosity and correspondingly is distorted more than wave form 108. Wave form 112 is highly distorted which indicates that the earth tide is directly above a region of abnormally low viscosity. As the tide begins to leave the low viscosity region, the amount of distortion lessens as indicated by wave shape 114 and later-occurring wave shape 116. When the earth tide has passed beyond the region of abnormally low viscosity and into a region of uniform viscosity, the wave shape again will be a basically straight line, as indicated by the last wave shape 118 in FIG. 15.

The dynamic changes in the shapes of the wave fronts locate the region of abnormal viscosity with the most distorted wave occurring above or near the leading edge of the low viscosity region. The absolute magnitude of the distortion is not critical in determining the location of the low viscosity region. Only the relative magnitude of the distortion from one wave to the next is critical.

The magnitude of the distortion does, however, provide at least a qualitative indication of the subsurface depth of the low viscosity formation. A low viscosity formation which is relatively near the earth's surface will cause highly distorted wave shapes while a deep, low viscosity formation will result in wave shapes having relatively lesser distortion.

The components of a system suitable for generating the information required to plot the shape of earth tide wave fronts over a region of interest has already been described in block diagram form. FIG. 16 is a detailed logic diagram of the clock reset circuit 80 used to reset the previously described clock-controlling flip flop 86. The clock reset circuit includes a trio of AND gates 120, 122, 124, each having an input from the inverter amplifier connected to each of the photodetector outputs. Each of the AND gates, 120, 122, and 124 recognizes a unique combination of photodetector outputs, going high only when that combination exists. For example, the PD2 and PD3 inputs to AND gate 120 are inverted as is conventionally indicated by the small circles interposed between the gate 120 and the leads labeled PD2 and PD3. Therefore, AND gate will go high only when PD1 = 0, PD2 = 0 and PD3 = 0. Table 1 below indicates which of the gates is high for a particular combination of PD1, PD2 and PD3 signals.

TABLE 1

| $\overline{PD1}$ | $\overline{PD2}$ | $\overline{PD3}$ | GATE WITH HIGH OUTPUT |
|---|---|---|---|
| 0 | 0 | 1 | Gate 124 |
| 0 | 1 | 0 | Gate 122 |
| 1 | 0 | 0 | Gate 120 |
| 0 | 0 | 0 | None |

The table indicates that at least one of the gates will have a high output for any combination of PD1, PD2, and PD3 signals except where all of those signals are low or 0. Under the latter conditions, all of the AND gate outputs are low.

The outputs from the three AND gates 120, 122, and 124 are applied to a NOR gate 126 which goes high only when the AND gates outputs are all low; that is, only when PDl, PD2 and PD3 are equal to 0. The output of the NOR gate 126 is applied to the reset input terminal of the flip flop 86, causing that flip flop to be reset, preventing further generation of clock pulses by clock 88, when the inverted outputs from all of the photodetectors remain at a low level.

Figure 17:
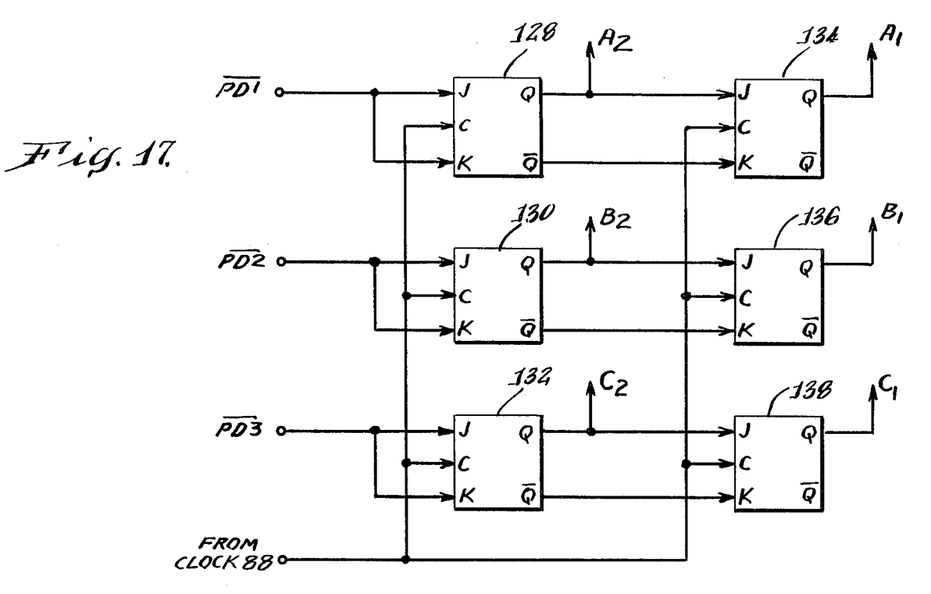
FIG. 17 is one embodiment of a two stage parallel shift register for the system shown in block diagram form in FIG. 13.

The two stage parallel shift register 84 is described in detail with reference to FIG. 17. The first stage of the shift register includes three J-K flip flops 128, 130 and 132, each having its J and K input terminals tied to the output of one of the inverter amplifiers 78. With both the J and the K inputs connected in common to the input, such a flip flop will transfer its input signal to its Q output terminal when a clock pulse is applied to the C or clock input terminal.

The second stage of the shift register is the second group of three flip flops 134, 136 and 138. The J input terminal to each of the flip flops is connected directly to the Q output terminal of an associated flip flop in the first stage while the K input to the second stage flip flop is connected to the $\overline{Q}$ output of the associated first stage flip flop. With the first and second stages connected in this manner, the application of a clock pulse to a flip flop in the second stage will cause the binary signal appearing in the J input terminal of the second stage flip flop to be transferred to the Q output terminal of that flip flop. For example, a binary 1 on the J input terminal to flip flop 134 will be transferred to the A1 output terminal when that flip flop is clocked. The Q output terminals for the second stage flip flops 124, 136 and 138 carry a first set of signals $A_1$, $B_1$, $C_1$, respectively, representing the inverted outputs of the photodetectors at a particular point in time. The Q output terminals of the first stage flip flops 128, 130, 132 carry a set of output signals $A_2$, $B_2$, $C_2$ respectively, representing the inverted photodetector outputs at a later point in time.

As the interferometric bands sweep across the photodetector array, the photodetector outputs will change in a predetermined pattern which differs depending on whether the bands are moving to the left or to the right. Assuming the bands are moving to the right, the sequence of inverted photodetector outputs is shown in Table 2.

TABLE 2

| A or $\overline{PD1}$ | B or $\overline{PD2}$ | C or $\overline{PD3}$ |
|---|---|---|
| 1 | 0 | 0 |
| 0 | 1 | 0 |
| 0 | 0 | 1 |
| 0 | 0 | 0 |
| 1 | 0 | 0 |
| 0 | 1 | 0 |
| | etc. | |

If the interferometric bands are moving from right to left, the sequence of signal patterns is reversed with the binary 1 propagating from right to left in a cycle having four possible signal states. The pattern sequence is shown below in Table 3.

TABLE 3

| A or PD1 | B or PD2 | C or PD3 |
|---|---|---|
| 1 | 0 | 0 |
| 0 | 0 | 0 |
| 0 | 0 | 1 |
| 0 | 1 | 0 |
| 1 | 0 | 0 |
| 0 | 0 | 0 |
| | etc. | |

An inspection of Tables 2 and 3 indicates that the patterns change in a predetermined sequence. By inspecting successive patterns, it is possible to determine whether the interferometric bands are moving to the right or to the left; that is, whether the crustal surface of the earth is rising or falling.

Figure 18:
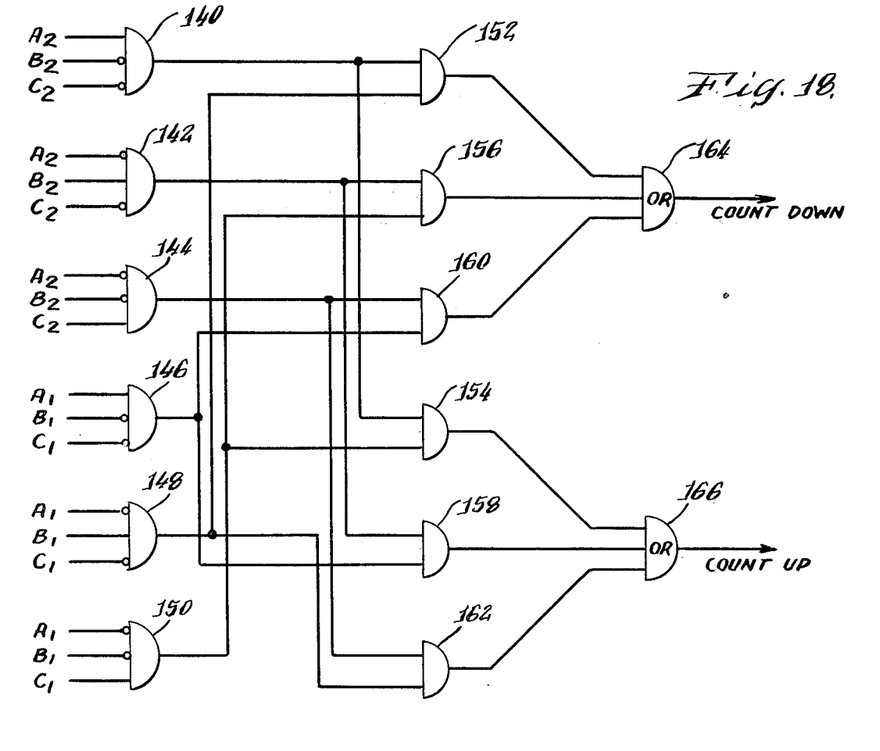
FIG. 18 is one embodiment of a rise/fall detector for use in the system shown in block diagram form in both of FIGS. 13 and 14.

A suitable rise/fall detector is illustrated in FIG. 18. The rise/fall detector includes a first set of AND gates 140, 142 and 144 having inputs from the Q output terminal of the flip flops 128, 130 and 132 in the first stage of the two stage shift register. Each of the AND gates 140, 142 and 144 will go high for one and only one combination of ones and zeros in the first stage of the two stage shift register. The rise/fall detector further includes AND gates 146, 148 and 150 which are similarly connected to the outputs of the flip flops in the second stage of the two stage shift register. Each of the AND gates in the second set also recognizes a unique combination of ones and zeros in the second stage of the shift register. The output of AND gate 140 provides an input to AND gates 152 and 154. AND gate 142 is connected to both AND gate 156 and AND gate 158 while AND gate 144 is connected to AND gates 160 and 162. The second input to each of these gates is provided by the AND gates 146, 148 and 150. For example, AND gate 146 is connected to AND gates 160 and 158.

Because of the manner in which the clock reset circuit operates, the two stage shift register does not receive any signals when all of the photodetector outputs are low. The rise/fall detector circuit 90 operates as if that particular signal pattern did not exist. Since the two inputs to each of the AND gates 152, 156, 160, 154, 158 and 162 represents inverted photodetector outputs at different periods of time, those AND gates can be used to determine the changes in the photodetector signal patterns. For example, AND gate 152 will go high only when the second stage of the shift register has a 010 signal pattern while the first stage of the shift register has a 100 signal pattern. Table 3 indicates that this particular sequence of signal patterns occurs when an interferometric bands are moving from right to left. Simple analysis of the input signals for each of the other AND gates will indicate when the output of the gate will go high. Basically, AND gates 152, 156 and 160 go high when the interferometric bands are moving from right to left whereas AND gates 154, 158 and 162 go high when the bands are moving from left to right.

Figure 14:
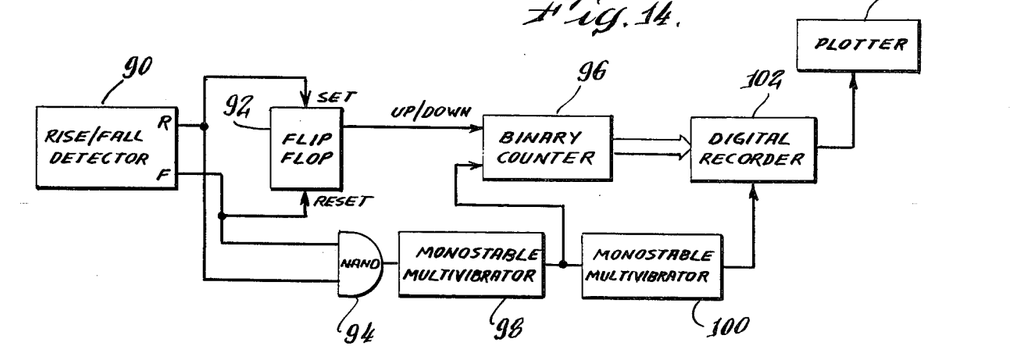
FIG. 14 is a block diagram of the remaining part of the circuit for measuring the magnitude of the earth tide at a point on the surface.

The AND gates 152, 156 and 160 provide inputs to an OR gate 164 which is connected to the set input terminal of the flip flop 92 (FIG. 14). AND gates 154, 158 and 162 provide inputs to a second OR gate 166, the output of which is connected to a reset input terminal of the flip flop 92.

While the instant invention is directed primarily to geophysical prospecting, other applications fall within the scope of the invention. For example, the method and system can be used to locate faults in the earth's crust which are indicative of oil field boundaries, uranium and other heavy metal deposits, potential earthquake locations, etc.

While there has been described what is considered to be a preferred embodiment of the present invention, variations and modifications therein will occur to those skilled in the art once they become acquainted with the basic concepts of the invention. Therefore, it is intended that the appended claims shall be construed to include all such variations and modifications as fall within the true spirit and scope of the invention.

What is claimed is:

1. A method of locating potentially hydrocarbon-bearing subsurface formations comprising the steps of:
    measuring the time of arrival and apparent direction of tidal wave movements of the earth's surface at each of a plurality of points; and
    combining the time and direction measurements to establish the wave shape in the region of interest, said wave shape being indicative of the subsurface viscosity in said region.

2. A method of locating potentially hydrocarbon-bearing subsurface formations using tiltmeters to measure the rise and fall of the earth's surface due to the gravitational pull of the moon, said method comprising the steps of:
    detecting the rise and fall of the earth's surface at each of a plurality of points by means of the tiltmeters to establish the time of arrival and apparent direction of an earth tidal wave at each of the points;
    combining the time and direction mesurements to establish the tidal wave shape in a region of interest, said wave shape being indicative of the viscosity in the region.

3. A method as recited in claim 2 including the step of measuring the magnitude of the rise of the earth's surface to provide an indication of the subsurface depth of a formaton of interest.

4. A method as recited in claim 2 wherein the tiltmeter measurements are made along first and second axes at each of said plurality of points.

5. A method as recited in claim 4 including the step of measuring the magnitude of the rise of the earth's surface to provide an indication of the subsurface depth of a formation of having abnormal viscosity.

6. A system for locating potentially hydrocarbon-bearing subsurface formations comprising:
    tiltmeter means for detecting the rise and fall of the earth's surface at each of a plurality of points to establish the time of arrival and apparent direction of an earth tidal wave at each of the points;
    means for combining the tiltmeter measurements to establish the shape and dynamic changes in a region of interest, the wave shape providing an indication of the subsurface viscosity in the region.

7. A system as recited in claim 6 wherein said tiltmeter means comprises an array of tiltmeters arranged in a predetermined, known pattern over a region of interest.

8. A system as recited in claim 7 wherein each of said tiltmeters also measures the magnitude of the rise in the earth's surface at each of the plurality of points to provide an indication of the subsurface depth of a formation of abnormal viscosity.

9. A system as recited in claim 6 wherein said tiltmeter means is capable of detecting the rise and fall of the earth's surface along each of two orthogonal axes at each of the plurality of points.

10. A system as recited in claim 9 wherein said tiltmeter means comprises an array of tiltmeters arranged in a predetermined known pattern over a region of interest.

11. A system as recited in claim 10 wherein each of said tiltmeters also measures the magnitude of the rise in the earth's surface at each of the plurality of points to provide an indication of the subsurface depth of a formation of abnormal viscosity.

12. A system as recited in claim 6 wherein said tiltmeter means also measures the magnitude of the rise in the earth's surface at each of the plurality of points to provide an indication of the subsurface depth of a formation of abnormal viscosity.

* * * * *